US012749755B2

(12) United States Patent
(10) Patent No.: US 12,749,755 B2
(45) Date of Patent: Sep. 29, 2026

Seok et al.

(54) BATTERY CASE

(71) Applicant: POSCO CO., LTD, Pohang-si (KR)

(72) Inventors: Dong-Yoon Seok, Yeonsu-gu (KR); Hong-Woo Lee, Yeonsu-gu (KR); Jaehyun Kim, Yeonsu-gu (KR)

(73) Assignee: POSCO CO., LTD, Pohang-si (KR)

( * ) Notice: Subject to any disclaimer, the term of this patent is extended or adjusted under 35 U.S.C. 154(b) by 699 days.

(21) Appl. No.: 18/034,953

(22) PCT Filed: Oct. 29, 2021

(86) PCT No.: PCT/KR2021/015452

§ 371 (c)(1),
(2) Date: May 2, 2023

(87) PCT Pub. No.: WO2022/098006

PCT Pub. Date: May 12, 2022

(65) Prior Publication Data

US 2023/0420778 A1 Dec. 28, 2023

(30) Foreign Application Priority Data

Nov. 9, 2020 (KR) ........................ 10-2020-0148249

(51) Int. Cl.
*B60L 50/64* (2019.01)
*H01M 50/242* (2021.01)
(Continued)

(52) U.S. Cl.
CPC ........... *H01M 50/242* (2021.01); *B60L 50/64* (2019.02); *H01M 50/244* (2021.01); *H01M 50/249* (2021.01); *H01M 50/291* (2021.01)

(58) Field of Classification Search
CPC ... B60L 50/64; H01M 50/204; H01M 50/242; H01M 50/244; H01M 50/249; H01M 50/291
See application file for complete search history.

(56) References Cited

U.S. PATENT DOCUMENTS 9,056,631 B2 6/2015 Nakamori
10,547,039 B2 1/2020 Toyota
(Continued)

FOREIGN PATENT DOCUMENTS

CN 102092267 A 6/2011
CN 105593068 A 5/2016
(Continued)

OTHER PUBLICATIONS

Office Action dated May 29, 2025, issued in corresponding Chinese Patent Application No. 202180075146.0, with an English translation.

(Continued)

*Primary Examiner* — Kevin E Yoon
(74) *Attorney, Agent, or Firm* — Morgan Lewis & Bockius LLP

(57) ABSTRACT

The present invention relates to a battery case that can effectively handle side impacts in, for example, an electric vehicle or the like, and thereby minimize battery deformation. The battery case comprises: a case body for accommodating a battery cell; and a cover coupled to the case body. The case body includes: a bottom plate; a side frame coupled to the bottom plate so as to surround the battery cell and including an inner wall and an outer wall; a mounting frame coupled to the outer wall of the side frame; and at least one reinforcement material which is disposed on the bottom plate and of which both ends in the longitudinal direction are inserted into the side frame. The ends of the reinforcement material can pass through the inner wall and the outer wall of the side frame and come into contact with the mounting frame.

6 Claims, 10 Drawing Sheets

II-II'

Z
Y

(51) Int. Cl.

| | |
|---|---|
| ***H01M 50/244*** | (2021.01) |
| ***H01M 50/249*** | (2021.01) |
| ***H01M 50/291*** | (2021.01) |

(56) References Cited

U.S. PATENT DOCUMENTS

| | | | |
|---|---|---|---|
| 10,597,081 | B2 | 3/2020 | Ayukawa |
| 2015/0097384 | A1 | 4/2015 | Conrod |
| 2019/0157642 | A1 | 5/2019 | Toyota |
| 2019/0359047 | A1 | 11/2019 | Tsuyuzaki et al. |
| 2022/0029224 | A1 | 1/2022 | Chung et al. |

FOREIGN PATENT DOCUMENTS

| | | | | |
|---|---|---|---|---|
| CN | 109565011 | A | 4/2019 | |
| CN | 110048050 | A | 7/2019 | |
| CN | 211335559 | U | 8/2020 | |
| DE | 102016115037 | A1 * | 2/2018 | ............ H01M 50/20 |
| JP | H07-172349 | A | 7/1995 | |
| JP | 2891077 | B2 | 2/1999 | |
| JP | 2008-174181 | A | 7/2008 | |
| JP | 2015-103483 | A | 6/2015 | |
| JP | 2016-141316 | A | 8/2016 | |
| JP | 2019-018732 | A | 2/2019 | |
| JP | 2019-096385 | A | 6/2019 | |
| JP | 2019-202747 | A | 11/2019 | |
| KR | 10-1149700 | B1 | 5/2012 | |
| KR | 10-2019-0078936 | A | 7/2019 | |
| KR | 10-2027124 | B1 | 10/2019 | |
| KR | 10-2020-0032457 | A | 3/2020 | |
| KR | 10-2131535 | B1 | 7/2020 | |
| WO | 2015/048891 | A1 | 4/2015 | |
| WO | 2018/029168 | A1 | 2/2018 | |

OTHER PUBLICATIONS

Extended European Search Report issued Mar. 21, 2024 for European Patent Application No. 21889471.5.

International Search Report dated Feb. 8, 2022, issued in International Patent Application No. PCT/KR2021/015452 (with English translation).

Chinese Office Action dated Feb. 4, 2026 issued in Chinese Patent Application No. 202180075146.0 (with English translation).

* cited by examiner

【FIG. 1】
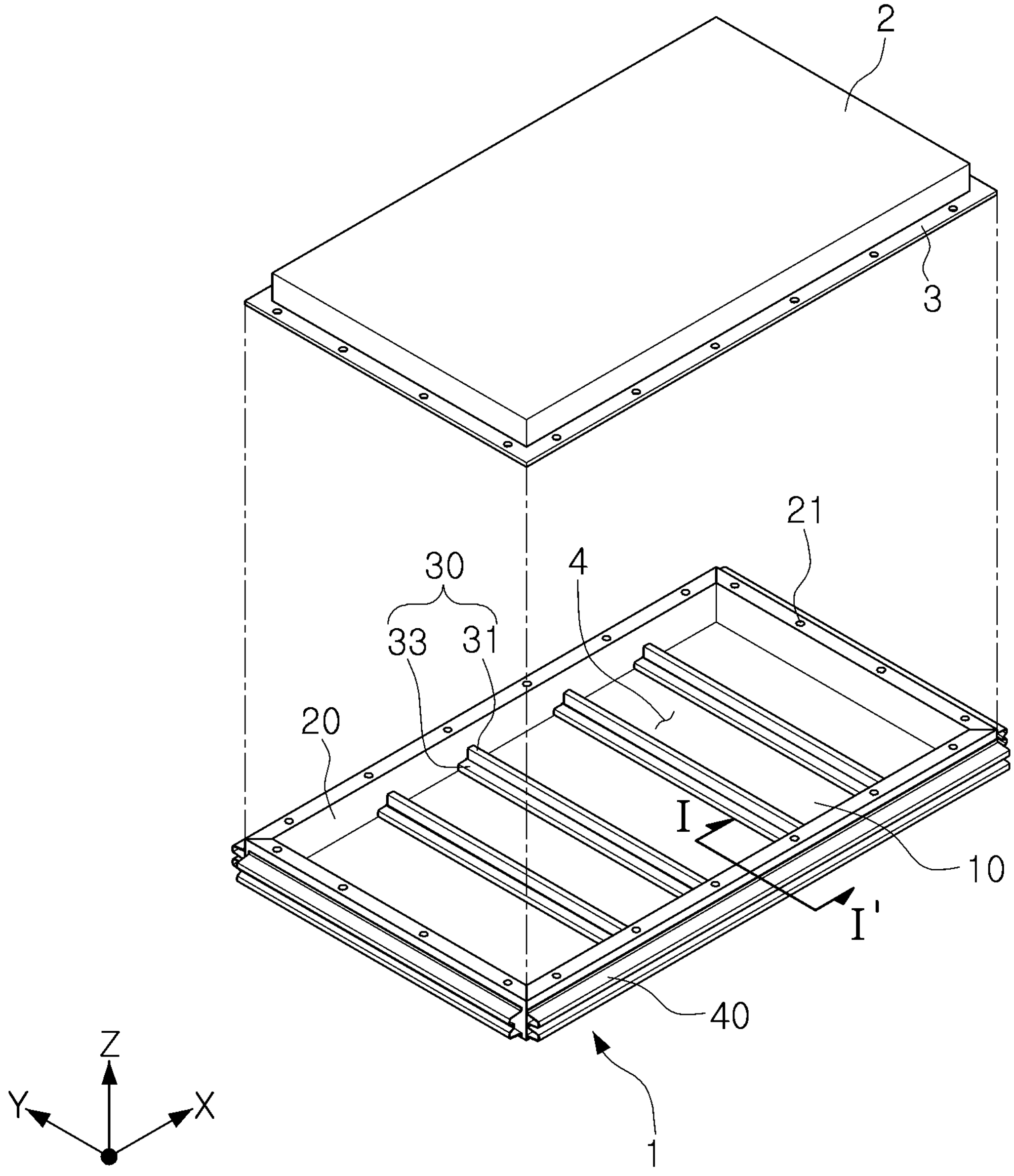

【FIG. 2】
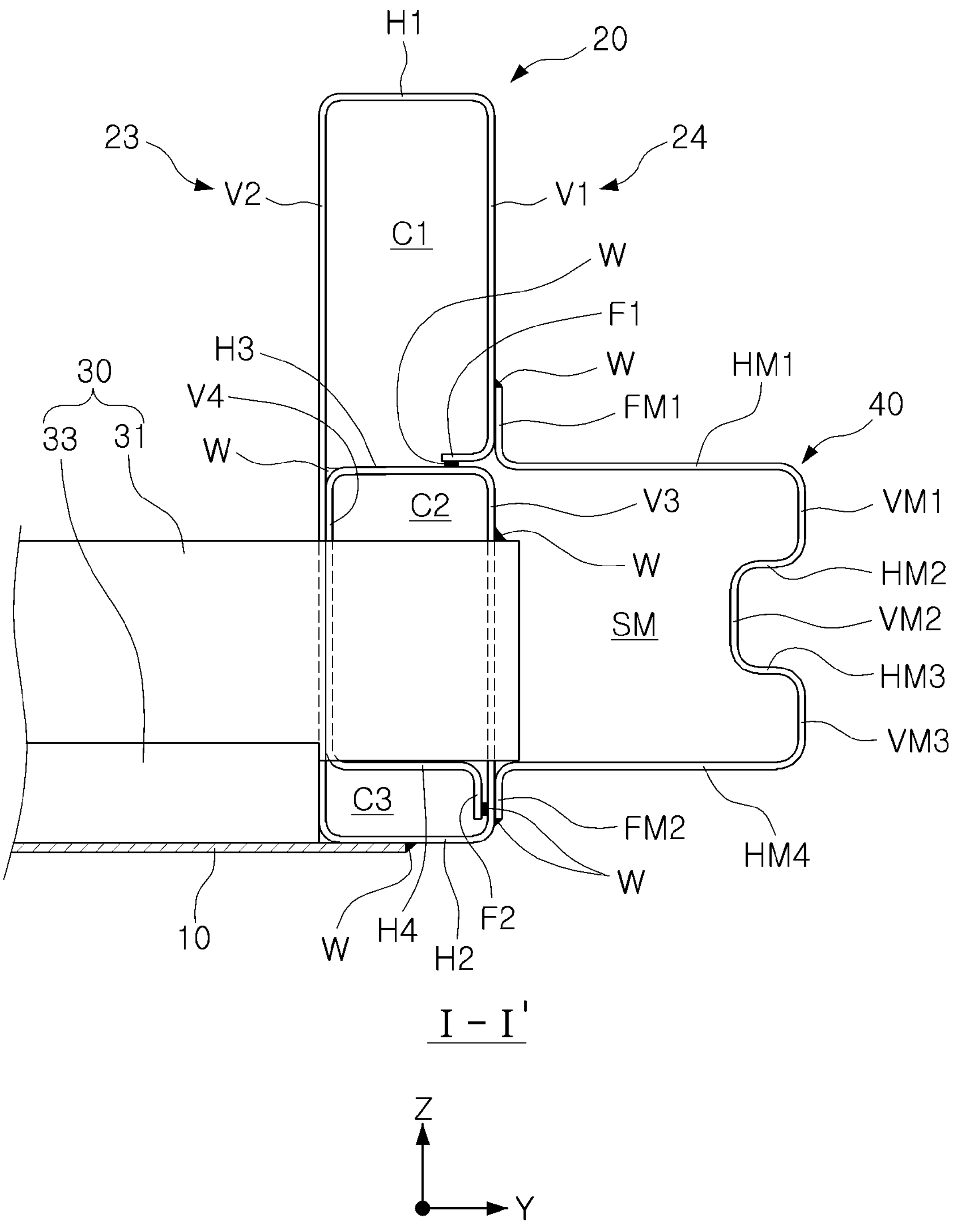

【FIG. 3】
(a)
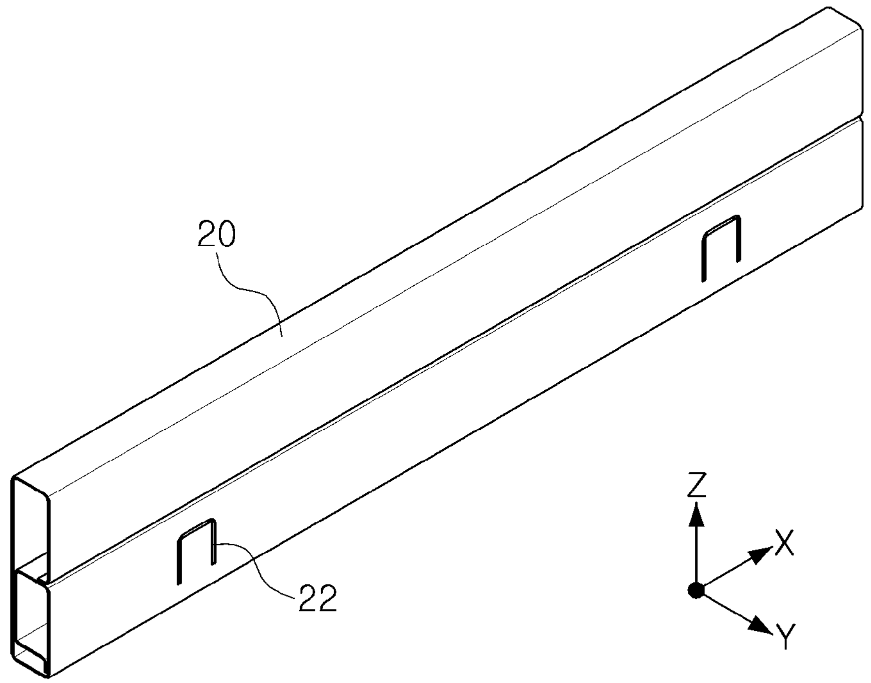
(b)
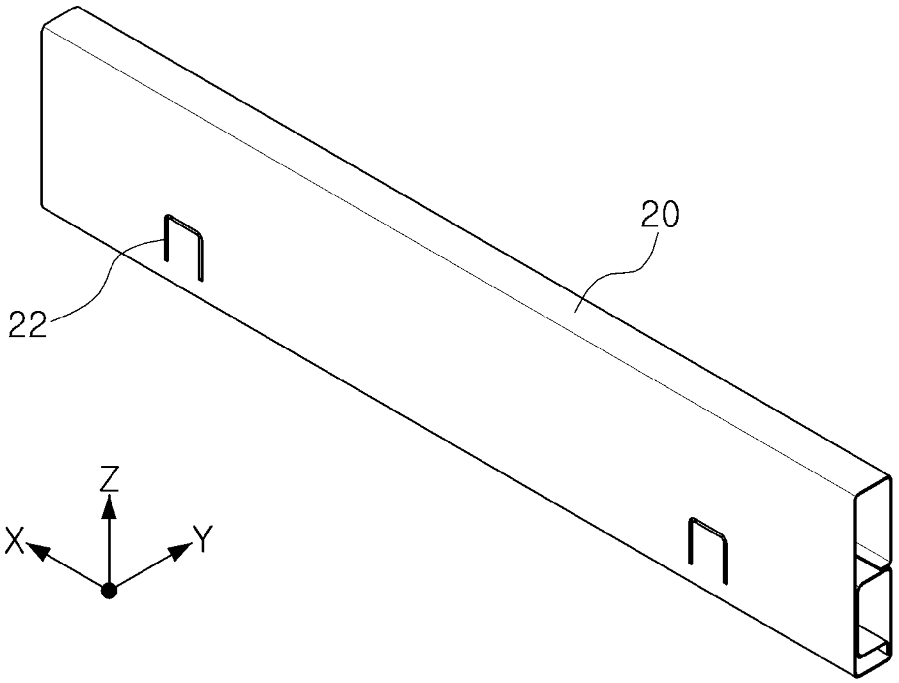

【FIG. 4】
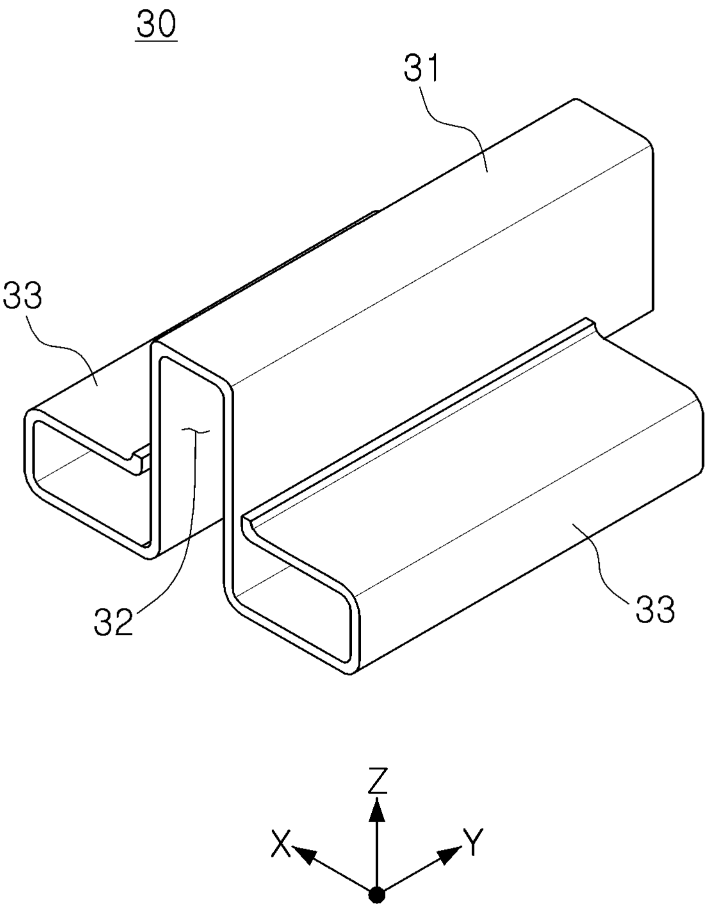

【FIG. 5】
(a)
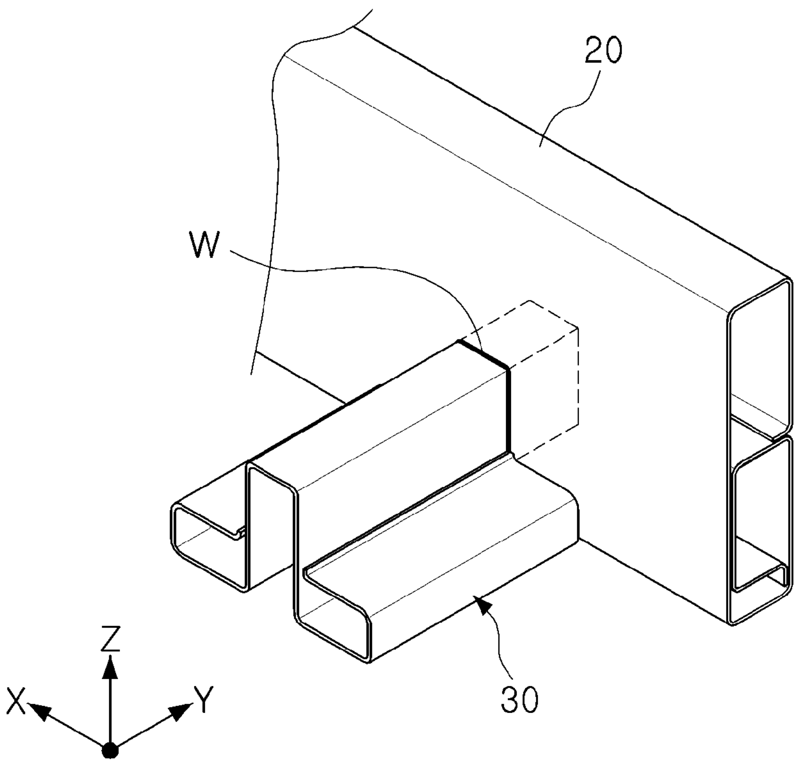
(b)
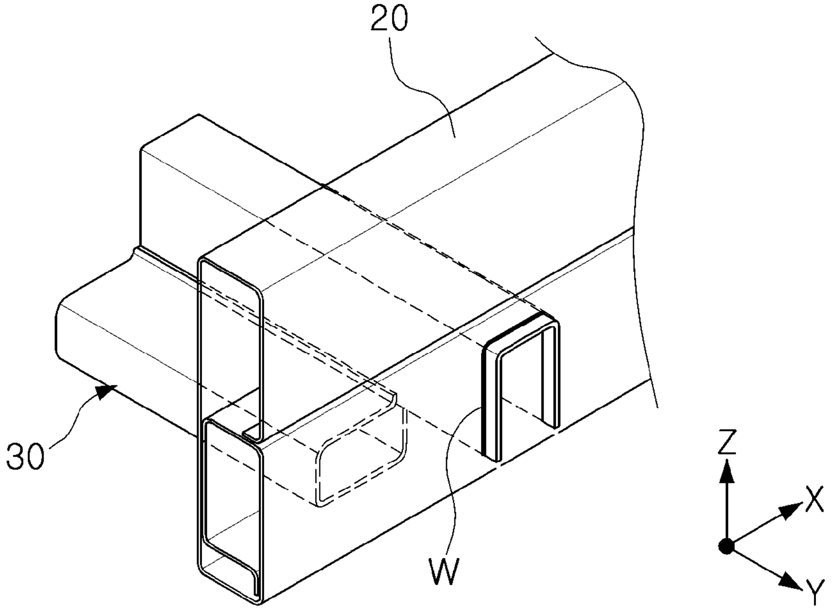

【FIG. 6】
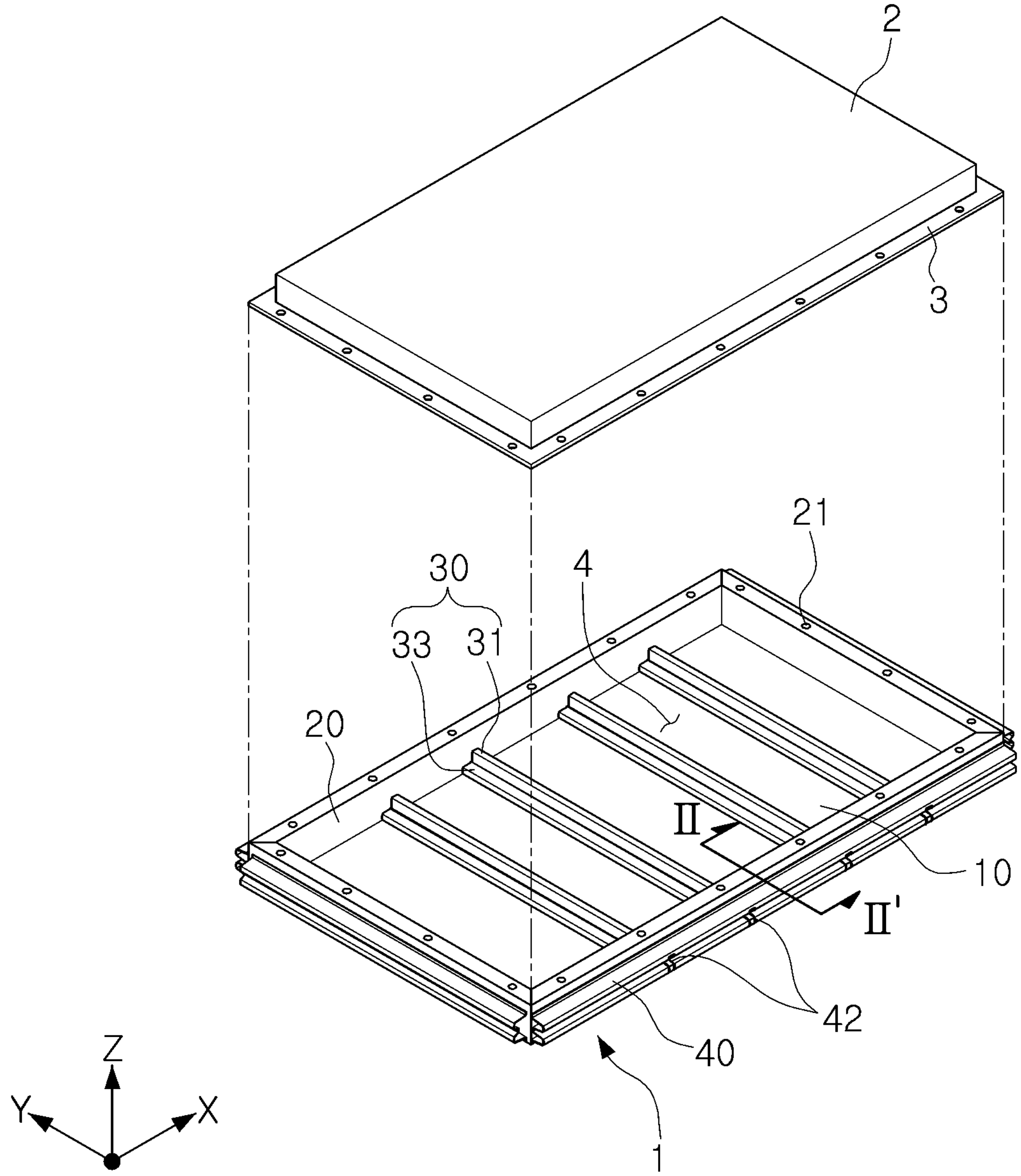

【FIG. 7】
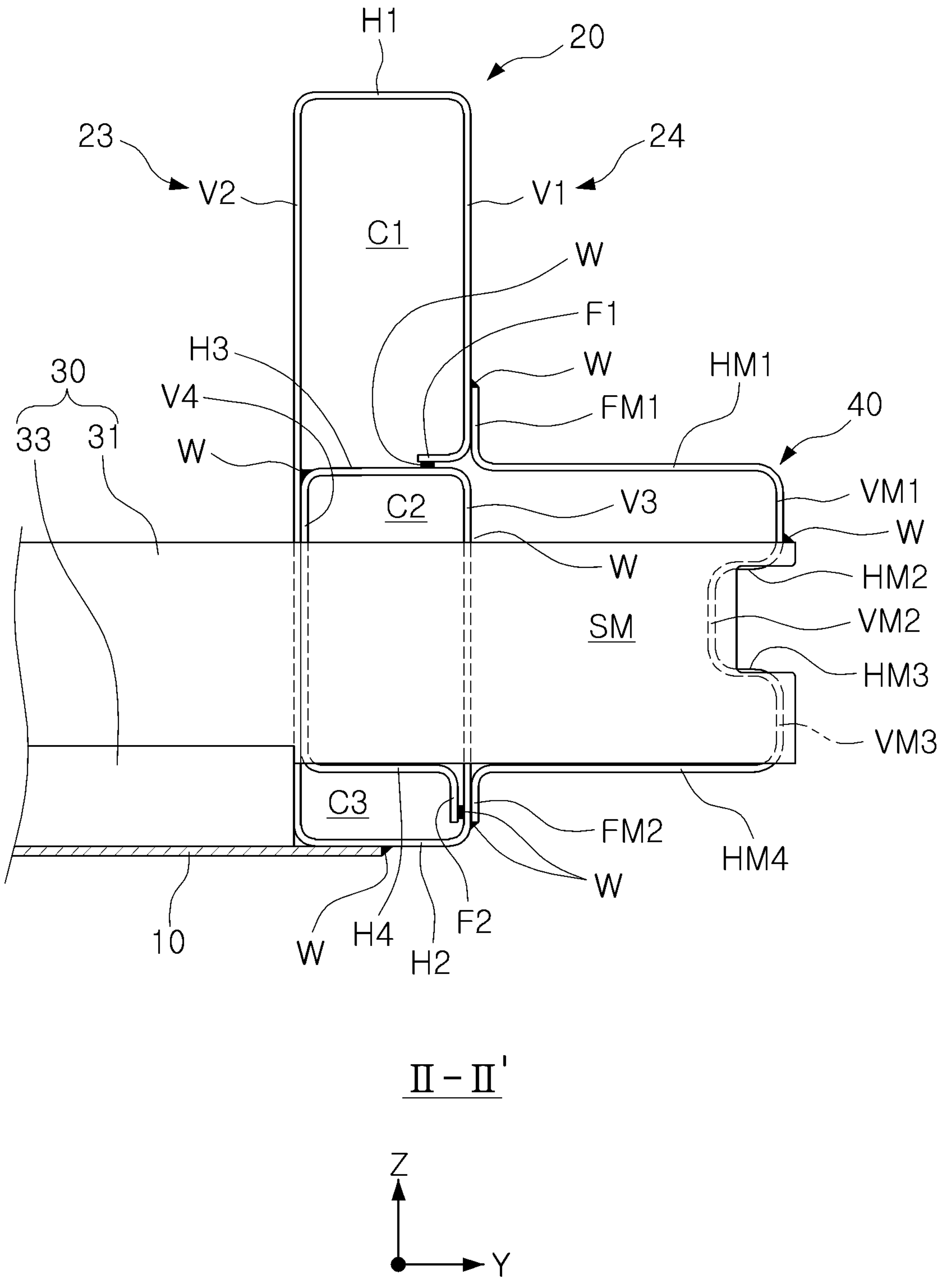

【FIG. 8】
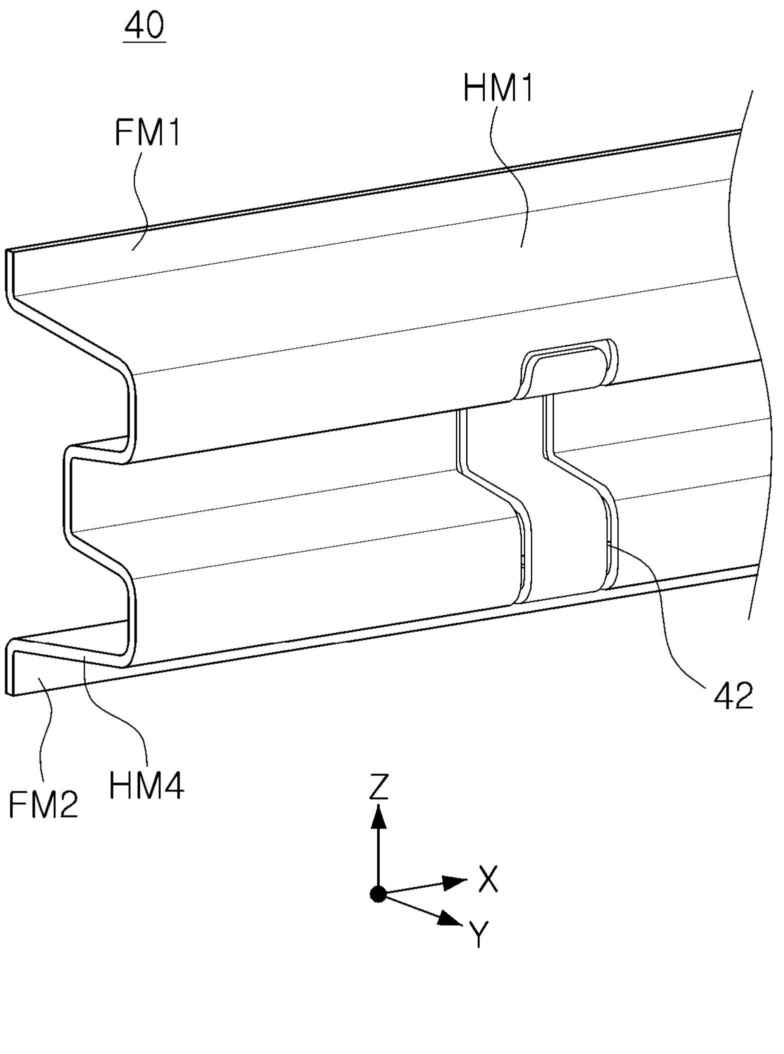

【FIG. 9】
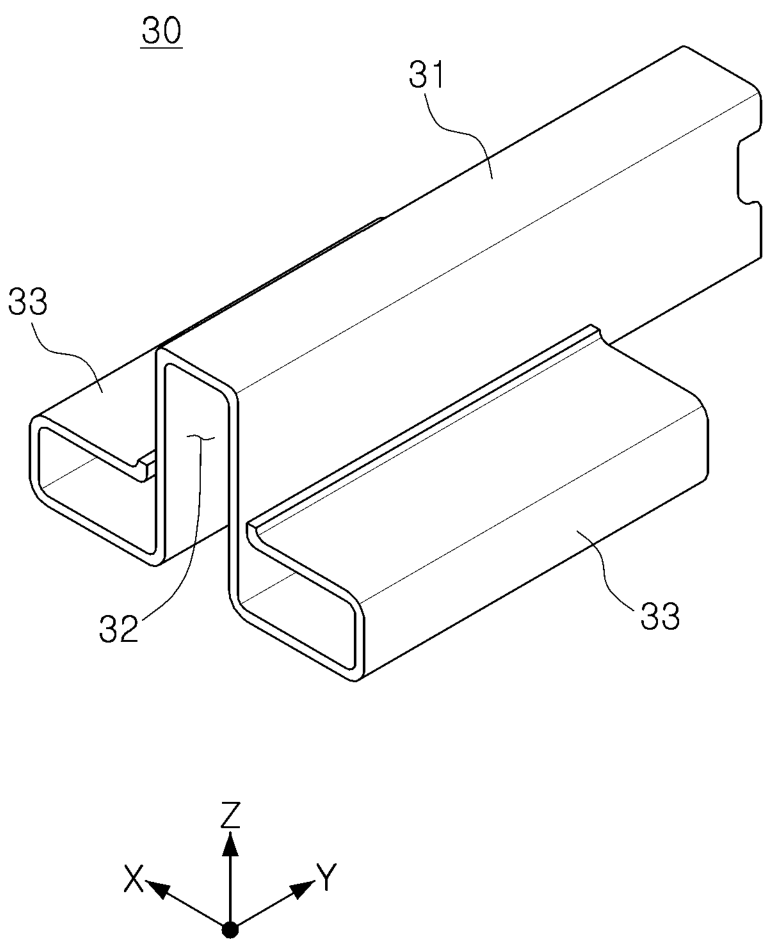

【FIG. 10】
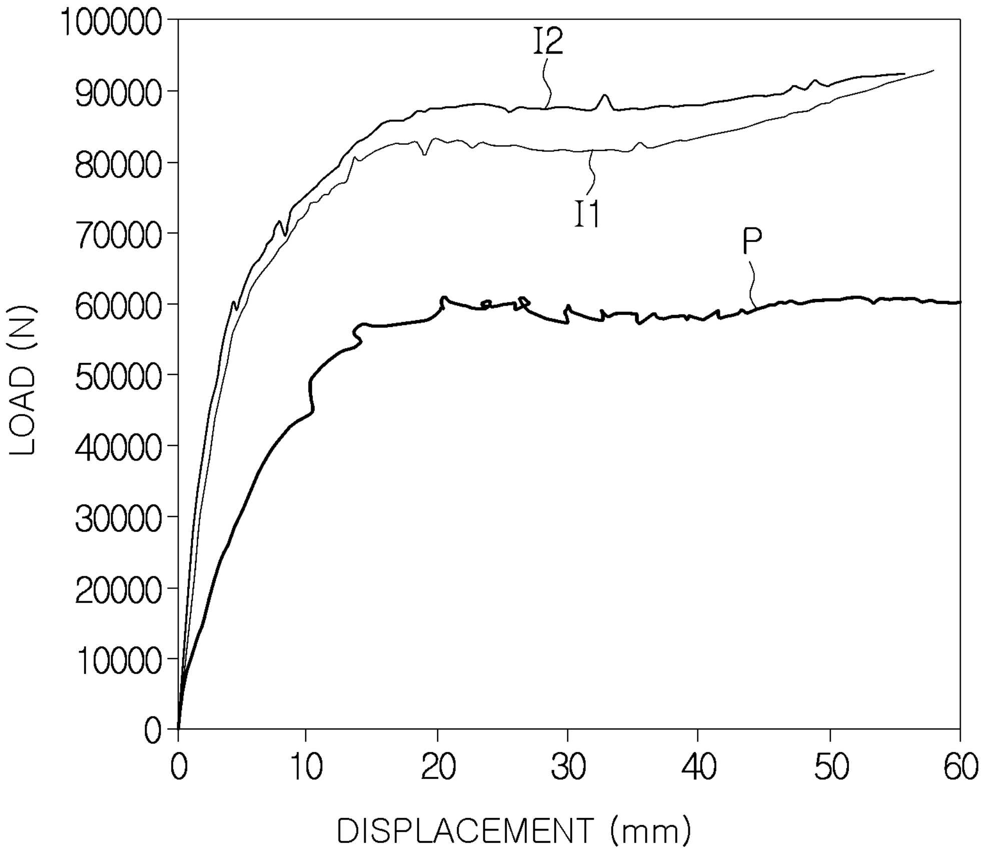

BATTERY CASE

CROSS-REFERENCE OF RELATED APPLICATIONS

This application is the U.S. National Phase under 35 U.S.C. § 371 of International Patent Application No. PCT/KR2021/015452, filed on Oct. 29, 2021, which claims the benefit of Korean Patent Application No. 10-2020-0148249, filed on Nov. 9, 2020, the entire disclosures of each are incorporated by reference herein.

TECHNICAL FIELD

The present disclosure relates to a battery case, for example, minimizing a deformation amount of a battery when a side collision occurs in an electric vehicle or the like.

BACKGROUND ART

A battery pack mounted in an electric vehicle or the like may lead to fire and explosion when the vehicle collides, causing a serious risk to a driver and a passenger therein.

In particular, since the battery pack has less space to absorb collision energy in a lateral direction of the vehicle, compared to in front and rear directions of the vehicle, it is important to prepare a structure capable of responding to a side collision to protect a battery cell therein, when the side collision occurs.

Conventionally, although an aluminum extruded material is used to configure a side wall of a battery case, the aluminum extruded material may have a disadvantage in that price competitiveness is inferior due to an increase in material cost.

(Patent Document 1) JP 2019-18732 A

SUMMARY OF INVENTION

Technical Problem

An object of the present disclosure is to provide a battery case, for example, minimizing a deformation amount of a battery by effectively responding to a side collision in an electric vehicle or the like.

Solution to Problem

According to an aspect of the present disclosure, a battery case according to the present disclosure includes a case body accommodating a battery cell; and a cover coupled to the case body, wherein the case body includes a bottom plate; a side frame coupled to the bottom plate to surround the battery cell, and including an inner side wall and an outer side wall; a mounting frame coupled to the outer side wall of the side frame and having a space; and at least one reinforcement material disposed on the bottom plate and having both end portions in a longitudinal direction passing at least through the inner side wall of the side frame, wherein the side frame is formed to have at least three closed sections, the space of the mounting frame is located to correspond to one of the closed sections of the side frame, and an end portion of the reinforcement material is inserted into one of the closed sections of the side frame.

Advantageous Effects of Invention

As described above, according to the present disclosure, effects of matching a height of a transverse member of a side frame and a height of a transverse portion of a mounting frame, to effectively respond to a side collision, and coupling a reinforcement material and the side frame or the mounting frame, to protect a battery cell therein, which is the most important role of a battery case, and minimize an amount of internal intrusion in the side collision.

BRIEF DESCRIPTION OF DRAWINGS

FIG. 1 is an exploded perspective view illustrating a battery case according to a first embodiment of the present disclosure.

FIG. 2 is a view of FIG. 1, taken along line I-I'.

FIG. 3 is a perspective view illustrating a portion of the side frame illustrated in FIG. 2.

FIG. 4 is a perspective view illustrating a portion of the reinforcement material illustrated in FIG. 2.

FIG. 5 is a perspective view illustrating a coupled state of a reinforcement material and a side frame.

FIG. 6 is an exploded perspective view illustrating a battery case according to a second embodiment of the present disclosure.

FIG. 7 is a view of FIG. 6, taken along line II-II'.

FIG. 8 is a perspective view illustrating a portion of the mounting frame illustrated in FIG. 6.

FIG. 9 is a perspective view illustrating a portion of the reinforcement material illustrated in FIG. 6.

FIG. 10 is a graph illustrating deformation by analysis of battery cases according to the prior art and the present disclosure.

BEST MODE FOR INVENTION

Hereinafter, the present disclosure may be explained in detail through the drawings. In adding reference numerals to components of each of the drawings, it should be noted that the same components have the same numerals as much as possible even when they are displayed on different drawings.

FIG. 1 is an exploded perspective view illustrating a battery case according to a first embodiment of the present disclosure. As illustrated therein, a battery case may include a case body 1 and a cover 2.

The battery case may be fixedly installed on an under floor panel (not illustrated) constituting a vehicle body. For example, the battery case may have a substantially rectangular parallelepiped shape, and a plurality of battery cells (not illustrated) may be accommodated therein.

The case body 1 and the cover 2 may be coupled to each other to form a space therein.

For example, the case body 1 and the cover 2 may have flange portions 3 formed along respective rims, and these flange portions may overlap each other, and may be assembled by a fastener such as a bolts, a nut, a screw, or the like.

Alternatively, a flange portion 3 formed along a rim of the cover 2 and a side frame 20, to be described later, of the case body 1 may overlap each other, and coupling may be achieved by fastening with a fastener such as a bolts, a nut, a screw, or the like.

The cover 2 may be formed of high-strength plastic that may secure sufficient strength while reducing weight and cost, or may be formed of light metal such as aluminum or the like. When a material thereof is plastic, the cover may be formed by performing injection molding, compression molding, or the like, and when the material is metal, the cover may be formed to have a predetermined shape by performing press processing or the like.

Since the case body 1 may be directly exposed externally and there may be a high risk of breakage and damage due to an external foreign substance, the case body 1 may be formed of metal to more effectively protect a battery cell.

In this case, the case body 1 may be prepared by machining a material such as a steel material having appropriate strength, for example, an ultra-high-strength steel material having a tensile strength of about 980 MPa or more for light weight, to prepare components, and then assembling and combining the components.

Hereinafter, for convenience, the battery case will be mainly described with the case body 1.

FIG. 2 is a view of FIG. 1, taken along line I-I', and FIG. 3 is a perspective view illustrating a portion of the side frame illustrated in FIG. 2, and has portion (a) thereof as a view viewed from an outer surface of the case body 1 and portion (b) thereof as a view viewed from an inner surface of the case body 1.

In the battery case according to the first embodiment of the present disclosure, the case body 1 may include a bottom plate 10, a side frame 20, a mounting frame 40, and at least one reinforcement material 30.

The bottom plate 10 may be, for example, a flat plate formed of metal such as a steel material or the like. The flat plate may be prepared by cutting to a predetermined width and a predetermined length. The bottom plate may act as a member supporting a battery cell or the like.

A height of the side frame 20 may be relatively changed according to a size of a battery cell embedded in the case body 1. In addition, a plurality of fastening holes 21 (see FIG. 1) for coupling with the cover 2 may be formed in an upper surface of the side frame.

At least four side frames 20 may be provided to surround the battery cell. For example, side frames may be disposed along a rim of the bottom plate 10. Both end portions of each of the side frames may be cut obliquely at a predetermined angle (e.g., approximately 45 degrees) to contact the other side frame, corresponding thereto, in both end portions of each thereof, and may be then joined by performing welding such as arc welding, laser welding, or the like. Thus, the side frame may constitute a side wall of the case body 1.

As illustrated in FIG. 3, a through-slit 22 may be formed in an inner side wall 23 of the side frame 20 constituting at least an inner surface of the case body 1, among both side walls disposed in a width direction (e.g., Y direction in the drawing) of the side frame at a predetermined position.

Optionally, a through-slit 22 may be formed in an outer side wall 24 constituting an outer surface of the case body 1.

In this case, a shape of the inner side wall 23 and a shape of the outer side wall 24, illustrated in FIG. 3, are not limited to the illustrated examples, and the inner and outer side walls may have opposite shapes.

The through-slit 22 may be formed to have a shape corresponding to a cross-sectional shape of the reinforcement material 30 to be described later, and thus, when an end portion of the reinforcement material is fitted into the through-slit, they may be shape-fitted with each other.

For example, the side frame 20 may be formed to have a rectangular closed cross-section, as a whole, using metal such as a steel material, aluminum, or the like.

More specifically, the side frame 20 may be formed of a plate material such as 1470 martensitic (MART) steel having a thickness of about 0.8 mm to 1.0 mm, produced by the present applicant, or the like.

In this case, the 1470 MART steel may have a tensile strength of 1,470 MPa or higher and a yield strength of 1,050 MPa or higher, to improving crash safety.

For example, in the steel material, the side frame 20 may be formed to have at least three closed cross-sections by bending a single plate material having a predetermined width and a predetermined length, several times, and then welding the met end portions thereof. As the machining, bending, roll forming, or the like may be used.

For example, the plate member may extend from one end in a longitudinal direction Z by a first height to form a first longitudinal member V1, and may be then bent once in a first direction (counterclockwise direction in FIG. 2). Thereafter, the same may extend in a transverse direction Y by a predetermined length to form a first transverse member H1, and may be then bent once in the same direction. Subsequently, the same may be lowered in the longitudinal direction by a second height to form a second longitudinal member V2, and may be then bent once in the same direction. Thereafter, the same may extend in the transverse direction by a predetermined length to form a second transverse member H2, and may be then bent once in the same first direction. Subsequently, the same may extend in the longitudinal direction by a third height to form a third longitudinal member V3, and may be then bent once more in the same direction.

The third height of the third longitudinal member V3 may be shorter than the second height of the second longitudinal member V2, such that spaces partitioned by the first longitudinal member V1-the first transverse member H1-the second longitudinal member V2-the second transverse member H2-the third longitudinal member V3 may be divided into two closed sectional regions. In this case, a closed section on one side may be referred to as a first closed section C1. For example, the first closed cross-section may have a rectangular cross-section.

Then, the same may extend in the transverse direction Y by a predetermined length to form a third transverse member H3, and may be then bent once in the same first direction. Subsequently, the same may be lowered in the longitudinal direction Z by a fourth height to form a fourth longitudinal member V4, and then bent once more in the same direction.

The fourth height of the fourth longitudinal member V4 may be shorter than the third height of the third longitudinal member V3, such that spaces partitioned by a portion of the second longitudinal member V2-the second transverse member H2-the third longitudinal members V3-the third transverse member H3 may be divided into two closed sectional regions. In this case, a closed section adjacent to the first closed section C1 may be referred to as a second closed section C2, and a remaining closed section may be referred to as a third closed section C3. For example, the second closed section or the third closed section may have a rectangular cross-section.

Thereafter, the same may extend in the transverse direction Y by a predetermined length to form a fourth transverse member H4.

In this manner, the same may extend by a predetermined length, bending may be then repeated to form a plurality of closed sections with a desired number of longitudinal members and a desired number of transverse members, and then the plate material may be terminated at the other end.

In the battery case according to the first embodiment of the present disclosure, the side frame 10 may be formed to have at least three closed sections C1, C2, and C3, and thus four or more transverse members H1, H2, H3, and H4 may be provided.

Finally, both ends of the plate material may be bent clockwise or counterclockwise, respectively, to form a flange. For example, one end of the plate member may be bent in a second direction (clockwise direction), opposite to the first direction, to form a first flange F1, and the other end thereof may also be bent in the second direction to form a second flange F2.

The first flange F1 may be welded to the third transverse member H3 by arc welding, laser welding, or the like, to form a welded portion W. The second flange F2 may be welded to the third longitudinal member V3 by arc welding, laser welding, or the like to form a welded portion.

In addition, the fourth longitudinal member V4 may be welded to one side of the second longitudinal member V2 by arc welding, laser welding, or the like to form a welded portion W.

In this manner, the second longitudinal member V2 and the fourth longitudinal member V4 may overlap each other, such that the inner side wall 23 or the outer side wall 24 of the side frame 20 may be partially thick, and, through this, the side wall of the side frame may be strengthened to minimize an amount of internal intrusion of the battery pack in a side collision.

For example, an overlapped portion of the second longitudinal member V2 and the fourth longitudinal member V4 may be located on the inner side wall 23 of the side frame 20, but is not necessarily limited thereto.

Shapes of the closed sections may be adjusted according to design conditions, and the through-slit 22 may be formed by punching in advance in a blanking process of a plate material. For example, through-slits may be formed, in advance, in a portion corresponding to the second longitudinal member V2, a portion corresponding to the third longitudinal member V3, or a portion corresponding to the fourth longitudinal member V4 in the plate material.

The bottom plate 10 and the side frame 20 may be coupled to each other by welding, such as, for example, arc welding or the like. The bottom plate may be welded to a bottom surface of the side frame, for example, an outer surface of the second transverse member H2, to form a welded portion W. Therefore, the case body 1 may have a space 4 (see FIG. 1) by the side frame forming a closed section around the bottom plate.

The mounting frame 40 may be coupled to the outer side wall 24 of the side frame 20 constituting an outer surface of the battery case. For example, a flange may be formed on the mounting frame, and the flange of the mounting frame may be welded to an outer surface of the side frame by arc welding or the like.

The mounting frame 40 may be fixed to, for example, a side portion of the vehicle body by bolting or the like. Thus, the battery case may be fixed to the vehicle body.

In addition, the mounting frame 40 may act as a member to firstly respond to a collision in the battery case in the collision.

The mounting frame 40 may be formed by machining a single piece of metal, for example a steel material.

More specifically, the mounting frame 40 may be formed of a plate material such as 1470 MART steel having a thickness of about 1.2 mm to 1.6 mm, produced by the present applicant, or the like.

In this manner, since the mounting frame 40 may be thicker than the side frame 20, it is possible to obtain an effect of increasing a repulsive force against a collision of the battery case.

The mounting frame 40 may be formed to have a meandering cross-sectional shape by bending a single plate material having a predetermined width and a predetermined length several times. Therefore, a cross-section of the mounting frame may be formed to have a W-shape lying sideways. As the machining, bending, roll forming, forming, or the like may be used.

For example, a plate material may extend in the transverse direction Y by a predetermined length from one end to form a first transverse portion HM1, may be bent once in the second direction (clockwise direction in FIG. 2), may be lowered in the longitudinal direction Z by a first height to form a first longitudinal portion VM1, and may be then bent once in the same direction.

Subsequently, the same may extend in the transverse direction Y by a predetermined length to form a second transverse portion HM2, may be bent once in the first direction (counterclockwise direction in FIG. 2), opposite to the initial bending direction, may be lowered in the longitudinal direction Z by a second height to form a second longitudinal portion VM2, and may be then bent once in the same first direction.

Next, the same may extend in the transverse direction Y by a predetermined length to form a third transverse portion HM3, may be bent once in the second direction, which may be the first bending direction, may be lowered in the longitudinal direction Z by a third height to form a third longitudinal portion VM3, and may be then bent once more in the same second direction.

Thereafter, the same may extend in the transverse direction Y by a predetermined length to form a fourth transverse portion HM4.

In this manner, the same may extend by a predetermined length, bending may be then repeated to form a desired number of longitudinal members and a desired number of transverse members, and then the plate material may be terminated at the other end.

In the battery case according to the first embodiment of the present disclosure, the mounting frame 40 may have at least two transverse portions (the first transverse portion HM1 and the fourth transverse portion HM4).

Finally, both ends of the plate material may be bent clockwise or counterclockwise, respectively, to form a flange. For example, one end of the plate member may be bent in the second direction to form a first coupling flange FM1, and the other end thereof may be bent in the first direction to form a second coupling flange FM2.

The first coupling flange FM1 may be welded to an outer surface of, for example, the first longitudinal member V1 constituting the outer side wall of the side frame 20 by arc welding or the like to form a welded portion W. The second coupling flange FM2 may be welded to an outer surface of, for example, the third longitudinal member V3 of the side frame by arc welding or the like to form a welded portion.

The mounting frame 40 may have an open space SM between the first transverse portion HM1 and the fourth transverse portion HM4 due to a bent shape thereof.

For example, the space SM of the mounting frame 40 may be located to correspond to the second closed section C2 of the plurality of closed sections of the side frame 20.

As described above, as the coupling flanges FM1 and FM2 of the mounting frame 40 may be coupled to the outer side wall 24 of the side frame 20 by arc welding or the like, the space SM of the mounting frame may be provided as a closed section.

In addition, in the battery case according to the first embodiment of the present disclosure, a transverse member (e.g., the third transverse member H3 and the fourth transverse member H4) of the side frame partitioning one (e.g., C2) of the plurality of closed sections of the side frame 20 and a transverse portion (the first transverse portion HM1 and the fourth transverse portion HM4) of the mounting frame partitioning the space SM of the mounting frame 40 may be located on the same height in the longitudinal direction Z.

For example, as illustrated in FIG. 2, the third and fourth transverse members H3 and H4 of the side frame 20 may be located on the same height as the first and fourth transverse portions HM1 and HM4 of the mounting frame 40, respectively.

Therefore, the battery case according to the first embodiment of the present disclosure may form a structure equipped with transverse members or transverse portions equivalent to an extruded material of complex cross-section formed of aluminum or aluminum alloy, even though a steel material cheaper than aluminum or aluminum alloy may be applied thereto.

The transverse members and the transverse portions may be aligned to match each other in height such that they act as reinforcing portions in the battery case, enabling the battery case to effectively resist a side collision applied externally.

In addition, the collision performance of the battery case may be secured by adjusting strength or thickness of a plate material constituting the side frame 20 and strength or thickness of a plate material constituting the mounting frame 40.

Moreover, a material of the plate material constituting the side frame 20 and a material of the plate material constituting the mounting frame 40 may be differentiated or an ultra-high strength steel of 980 MPa or more may be adopted, to achieve an optimal combination for light weight of the battery case.

A cross-sectional shape of the mounting frame 40 may be adjusted according to design conditions, and the through-slit 42 may be formed in advance in a blanking process of the plate material.

FIG. 4 is a perspective view illustrating a portion of the reinforcement material illustrated in FIG. 2, and FIG. 5 is a perspective view illustrating a coupled state of a reinforcement material and a side frame, and has portion (a) thereof as a view viewed from an inner surface of the case body 1 and portion (b) thereof as a view viewed from an outer surface of the case body 1.

The reinforcement material 30 may be fixedly installed on the inner surface of the case body 1 in which the battery cells is accommodated, for example, on the bottom plate 10. The reinforcement material may be fixed to the bottom plate by welding or the like, but the fixing method is not necessarily limited thereto.

In addition, the reinforcement material 30 may be integrally formed by machining a single plate of metal, such as a steel material or the like. The reinforcement material may be formed by bending, roll forming, forming, or the like.

For example, when the reinforcement material 30 is manufactured by roll forming, it is possible to form an even ultra-high-strength steel material having a tensile strength of about 980 MPa or more without difficulty. Moreover, in roll forming, compared to press forming, it may be easy to compensate for spring back and may have an advantage of being able to reduce a corner radius of the reinforcement material.

More specifically, the reinforcement material 30 may be formed of a plate material such as 1470 MART steel having a thickness of about 1.0 mm to 1.2 mm, produced by the present applicant, or the like.

In this case, a thickness of the plate material of the reinforcement material 30 may be thicker than a thickness of a plate material of the side frame 20.

The reinforcement material 30 may be formed by bending a single plate material having a predetermined width and a predetermined length several times, and molding the same to have a substantially hat-shaped cross-sectional shape. Therefore, the reinforcement material may include a body 31 having a hollow portion 32 formed to have a substantially downward U-shape, and a support portion 33 extending to both sides in the width direction X of the body on an open end portion of the hollow portion extending in the longitudinal direction Y of the body. For example, the support portion may be formed to extend from an end portion of the body in the width direction of the body.

In this case, the support portion 33 may be formed to have a closed cross-section by welding an end portion of the support portion to the body after bending in a direction, opposite to the bending direction of the body 31.

In addition, the support portion may be omitted in some regions of the body 31 constituting both end portions of the reinforcement material 30 in the longitudinal direction, and both end portions of the reinforcement material from which the support portion may be omitted in this manner may be formed by reflecting them on the plate material in a blanking process. Therefore, a length of the support portion in the longitudinal direction X may be formed to be shorter than a length of the body.

The support portion 33 of the reinforcement material 30 and the bottom plate 10 may be joined to each other by welding such as arc welding, laser welding, or the like. For example, since the support portion may be welded to the bottom plate over the entire length thereof in the longitudinal direction Y, watertightness between the support portion of the reinforcement material and the bottom plate may be ensured. Thus, a welded portion may be formed between the support portion of the reinforcement material and the bottom plate.

In this case, the hollow portion 32 of the body 31 constituting the reinforcement material 30 may be coupled to the bottom plate 10, to form a closed section.

In addition to a role of fixing the reinforcement material 30 to the bottom plate 10, the support portion 33 may also perform a role of supporting an arbitrary portion installed in the case body 1, such as a cooling plate or the like.

Both end portions of the reinforcement material 30 in the longitudinal direction Y may be in contact with the side frame 20, and may be inserted into the side frame to be coupled. As illustrated in FIG. 3 and described above, the through-slit 22 may be formed in at least the inner side wall 23 of the side frame contacting the end portion of the reinforcement material, such that the end portion of the reinforcement material may be fitted into the through-slit to be shape-fitted.

More specifically, the body 31 of the reinforcement material 30 may be inserted into the side frame 20 through the through-slit 22, such that an end portion thereof may be located in one closed section (for example, C2), among the plurality of closed sections in the side frame.

Optionally, the through-slit 22 may be formed in the outer side wall 24 constituting the outer surface of the case body 1, such that both end portions of the reinforcement material 30 in the longitudinal direction Y may pass through the side frame 20 in the width direction Y, and may then protrude outwardly from the side frame.

In this case, the end portion of the reinforcement material 30, for example, the end portion of the body 31 may pass through the through-slit 22 on both side walls of the side frame 20, and may protrude outwardly from the side frame, to apply welding for ensuring watertightness of the battery case.

A length of the end portion of the reinforcement material 30 passing through the side frame 20 and protruding from the side frame in the longitudinal direction Y of the reinforcement material may be about 5 to 10 mm. When the length of the protrusion is less than 5 mm, it may be difficult to weld, and when the length exceeds 10 mm, interference with neighboring components may occur, making it difficult to mount the battery case.

As illustrated in portion (b) of FIG. 5, a coupled portion between the protruding end portion of the reinforcement material 30 and the through-slit 22 of the side frame 20 may be joined to each other by welding such as arc welding, laser welding, or the like, and may form the welded portion W, to ensure watertightness between the end portion of the reinforcement material and the side frame.

The support portion 33 of the reinforcement material 30 may be in contact with the inner side wall 23 of the side frame 20 constituting the inner surface of the case body 1. For example, the support portion may not pass through the inner side wall.

The end portion of the reinforcement material 30, for example, the end portion of the body 31 may be inserted into and shape-fitted to the through-slit 22 of the side frame 20, to completely close the through-slit. Through this, watertightness between the end portion of the reinforcement material and the side frame may be guaranteed.

A matching line formed by inserting and shape-fitting the end portion of the reinforcement material 30 into the through-slit 22 may be welded by, for example, arc welding, laser welding, or the like, to form the welded portion W between the end portion of the reinforcement material and the side frame 20, as illustrated in portion (a) of FIG. 5.

Therefore, watertightness may be further ensured at the same time as a firm coupling between the end portion of the reinforcement material 30 and the side frame 20.

To secure watertightness, coating of a plastic material such as an acrylic resin, an epoxy resin, a silicone resin, or the like may be additionally applied to a coupled portion of components constituting the case body 1, for example, to the welded portion W.

The reinforcement material 30 may be provided as at least one reinforcement material. The number of reinforcement materials may be determined according to a magnitude of a collision applied externally.

As described above, in the battery case according to the first embodiment of the present disclosure, the reinforcement material 30 having a bent hat-shaped cross-section may be disposed on a bottom of the case body 1, and the reinforcement material may extend along the bottom of the case body to contact and insert into the side frame 20. For example, the reinforcement material may extend and may be coupled to the side frame by insertion, and an end portion of the reinforcement material may even be inserted into and passed through one of the closed sections of the side frame (for example, C2).

For example, in a side collision in an electric vehicle, or the like, in the battery case according to the first embodiment of the present disclosure, when collision energy is transferred to the side frame 20 of the case body 1 and deformed, the reinforcement material 30 may play a role for resisting the collision and deformation.

Therefore, according to the present disclosure, it is possible to obtain effects of protecting a battery cell therein and minimizing an amount of internal intrusion in the side collision.

FIG. 6 is an exploded perspective view illustrating a battery case according to a second embodiment of the present disclosure, and FIG. 7 is a view of FIG. 6, taken along line II-II'.

In the battery case according to the second embodiment of the present disclosure, a case body 1 may include a bottom plate 10, a side frame 20, a mounting frame 40, and at least one reinforcement material 30.

In this case, since components of the battery case according to the second embodiment of the present disclosure may be configured and used in the same manner as described in the first embodiment of the present disclosure described above, except that the reinforcement material 30 of the case body 1 penetrates the side frame 20 and contacts the mounting frame 40, detailed descriptions of the configuration and operation of the remaining components will be omitted.

The mounting frame 40 may be coupled to an outer side wall 24 constituting an outer surface of the battery case in the side frame 20, as described above. For example, coupling flanges FM1 and FM2 may be formed on the mounting frame, and the coupling flanges of the mounting frame may be welded to an outer side wall of the side frame by arc welding or the like.

The mounting frame 40 may be fixed to, for example, a side portion of a vehicle body by bolting or the like. Thus, the battery case may be fixed to the vehicle body.

In addition, the mounting frame 40 may act as a member to firstly respond to a collision in the battery case in the collision.

FIG. 8 is a perspective view illustrating a portion of the mounting frame illustrated in FIG. 6, and as illustrated therein, the mounting frame 40 may optionally have a through-slit 42 formed at a predetermined position.

The through-slit 42 may be formed in a shape corresponding to a cross-sectional shape of the reinforcement material 30 to be described later, and thus, when an end portion of the reinforcement material is inserted into the through-slit, they may be shape-fitted with each other.

The mounting frame 40 may be formed by machining a single piece of metal, for example a steel material.

More specifically, the mounting frame 40 may be formed of a plate material such as 1470 MART steel having a thickness of about 1.2 mm to 1.6 mm, produced by the present applicant, or the like.

The mounting frame 40 may be formed to have a meandering cross-sectional shape by bending a single plate material having a predetermined width and a predetermined length several times. Therefore, a cross-section of the mounting frame may be formed to have a W-shape lying sideways. As the machining, bending, roll forming, forming, or the like may be used.

The cross-sectional shape of the mounting frame 40 may be adjusted according to design conditions, and the through-slit 42 may be formed in advance in a blanking process of the plate material.

FIG. 9 is a perspective view illustrating a portion of the reinforcement material illustrated in FIG. 6.

The reinforcement material 30 may be fixedly installed on an inner surface of the case body 1 in which a battery cell is accommodated, for example, on the bottom plate 10. The reinforcement material may be fixed to the bottom plate by welding or the like, but the fixing method is not necessarily limited thereto.

In addition, the reinforcement material 30 may be integrally formed by machining a single plate of metal, such as a steel material or the like. The reinforcement material may be formed by bending, roll forming, forming, or the like.

For example, when the reinforcement material 30 is manufactured by roll forming, it is possible to form an even ultra-high-strength steel material having a tensile strength of about 980 MPa or more without difficulty. Moreover, in roll forming, compared to press forming, it may be easy to compensate for spring back and may have an advantage of being able to reduce a corner radius of the reinforcement material.

More specifically, the reinforcement material 30 may be formed of a plate material such as 1470 MART steel having a thickness of about 1.0 mm to 1.2 mm, produced by the present applicant, or the like.

In this case, a thickness of the plate material of the reinforcement material 30 may be thicker than a thickness of a plate material of the side frame 20, and may be thinner than a thickness of a plate material of the mounting frame 40.

The reinforcement material 30 may be formed by bending a single plate material having a predetermined width and a predetermined length several times, and molding the same to have a substantially hat-shaped cross-sectional shape. Therefore, the reinforcement material may include a body 31 having a hollow portion 32 formed to have a substantially downward U-shape, and a support portion 33 extending to both sides in the width direction X of the body on an open end portion of the hollow portion extending in the longitudinal direction Y of the body. For example, the support portion may be formed to extend from an end portion of the body in the width direction of the body.

In this case, the support portion 33 may be formed to have a closed cross-section by welding an end portion of the support portion to the body after bending in a direction, opposite to the bending direction of the body 31.

In addition, the support portion may be omitted in some regions of the body 31 constituting both end portions of the reinforcement material 30 in the longitudinal direction, and both end portions of the reinforcement material from which the support portion may be omitted in this manner may be formed by reflecting them on the plate material in a blanking process.

The support portion 33 of the reinforcement material 30 and the bottom plate 10 may be watertightly joined to each other by welding such as arc welding, laser welding, or the like. For example, since the support portion may be welded to the bottom plate over the entire length thereof in the longitudinal direction Y, watertightness between the support portion of the reinforcement material and the bottom plate may be ensured. Thus, a welded portion may be formed between the support portion of the reinforcement material and the bottom plate.

In this case, the hollow portion 32 of the body 31 constituting the reinforcement material 30 may be coupled to the bottom plate 10, to form a closed section.

In addition to a role of fixing the reinforcement material 30 to the bottom plate 10, the support portion 33 may also perform a role of supporting an arbitrary portion installed in the case body 1, such as a cooling plate or the like.

Both end portions of the reinforcement material 30 in the longitudinal direction Y may be coupled to meet the side frame 20 and pass through the side frame. As illustrated in FIG. 7 and described above, the through-slit 22 may be formed on both side walls of the side frame contacting the end portions of the reinforcement materials, such that the end portions of the reinforcement material are inserted into and shape-fitted to the through-slits, pass through one of the plurality of closed sections of the side frames, for example, a second closed section C2, and continue to extend in the width direction Y of the side frame.

The end portions of the reinforcement material 30 may be inserted into and shape-fitted to the through-slits 22 of the side frames 20, to completely close the through-slit. Through this, watertightness between the end portion of the reinforcement material and the side frame may be guaranteed.

In at least the inner side wall 23 constituting the inner surface of the case body 1, among the side walls of the side frame 20 contacting the end portion of the reinforcement material 30, a matching line formed by inserting and shape-fitting the end portion of the reinforcement material 30 into the through-slit 22 may be welded by, for example, arc welding, laser welding, or the like, to form the welded portion W between the end portion of the reinforcement material and the side frame 20

Therefore, watertightness may be further ensured at the same time as a firm coupling between the end portion of the reinforcement material 30 and the side frame 20.

The end portion of the reinforcement material 30, for example, the end portion of the body 31 may pass through the side frame 20 in the width direction Y of the side frame, may protrude from the side frame, and may be then in contact with an inner surface of the mounting frame 40.

Optionally, a concave groove (not illustrated) may be formed on the inner surface of the mounting frame 40 such that the end portion of the reinforcement material 30 extending from the side frame, for example, the end portion of the body 31 is seated in the concave groove.

Optionally, the through-slit 42 may be formed in the mounting frame 40 such that the end portion of the reinforcement material may be inserted into and shape-fitted to the through-slit, may pass through the mounting frame, and may then protrude outwardly from the mounting frame.

In this case, the end portion of the reinforcement material 30, for example, the end portion of the body 31 may pass through the side frame 20 in the width direction Y of the side frame, may protrude from the side frame, and may then protrude outwardly from the side frame, to apply welding for ensuring watertightness of the battery case.

A length of the end portion of the reinforcement material 30 passing through the side frame 20 and protruding from the side frame in the longitudinal direction Y of the reinforcement material may be about 5 to 10 mm. When the length of the protrusion is less than 5 mm, it may be difficult to weld, and when the length exceeds 10 mm, interference with neighboring components may occur, making it difficult to mount the battery case.

In this manner, a coupled portion between the protruding end portion of the reinforcement material 30 and the through-slit 42 of the side frame 20 may be joined to each other by welding such as arc welding, laser welding, or the like, and may form the welded portion W, to ensure watertightness between the end portion of the reinforcement material and the mounting frame.

To secure watertightness, coating of a plastic material such as an acrylic resin, an epoxy resin, a silicone resin, or the like may be additionally applied to a coupled portion of components constituting the case body 1, for example, to the welded portion W.

The support portion 33 of the reinforcement material 30 may be in contact with the inner side wall 23 constituting the inner surface of the case body 1 of the side frame 20, but, for example, the support portion may not pass through the inner side wall as well as the side frame.

The reinforcement material 30 may be provided as at least one reinforcement material. The number of reinforcement materials may be determined according to a magnitude of a collision applied externally.

As described above, in the battery case according to the second embodiment of the present disclosure, the reinforcement material 30 having a bent hat-shaped cross-section may be disposed on a bottom of the case body 1, and the reinforcement material may extend along the bottom of the case body to meet the side frame 20, may pass through the side frame and one of the closed sections (for example, C2), and may protrude from the side frame to contact the inner surface of the mounting frame 40 or pass through the mounting frame. For example, the reinforcement material may extend and be coupled to the side frame and the mounting frame.

For example, in a side collision in an electric vehicle, or the like, deformation occurs from the mounting frame 40 that first receives collision energy among battery cases.

In this case, in the battery case according to the second embodiment of the present disclosure, the reinforcement material 30 may play a role of resisting the collision from the start of deformation of the mounting frame 40 due to the side collision. In addition, even when the side frame 20 is deformed, the reinforcement material may play a role of resisting collision and deformation.

Therefore, according to the present disclosure, it is possible to obtain effects of protecting internal battery cells and minimizing an amount of internal penetration in the side collision.

FIG. 10 is a graph illustrating deformation by analysis of battery cases according to the prior art and the present disclosure.

FIG. 10 illustrates a support load (or a repulsive force) of a cross-section according to displacement between a battery case P of the prior art in which an end portion of a reinforcement material is joined to, but not inserted into, an inner side wall of a side frame formed of a steel material, a battery case I1 according to the first embodiment of the present disclosure in which a reinforcement material 30 passes through and is coupled to a side frame 20, and a battery case I2 according to the second embodiment of the present disclosure in which a reinforcement material passes through and is coupled to a side frame 20 and a mounting frame 40.

Referring to FIG. 10, in the battery case I2 according to the second embodiment of the present disclosure in which the reinforcement material 30 passes through the side frame 20 and the mounting frame 40, it can be seen that a load or a repulsive force received vertically in a cross-section is the greatest.

While the battery case P of the prior art has a cross-sectional load of 60 KN at a displacement of about 50 mm, the battery cases I1 and I2 according to the present disclosure have a cross-sectional load approaching or reaching a maximum of 90 KN at the same displacement.

The battery case according to the present disclosure has an increase in support load or repulsive force by about 50%, compared to the prior art, and absorbs a greater impact energy within the same displacement. Therefore, it is clearly illustrated to have a comparative advantage in energy absorption capacity.

As described above, according to the present disclosure, a height of a transverse member of a side frame and a height of a transverse portion of a mounting frame may be matched to sufficiently absorb impact energy transmitted from the mounting frame in a medial direction.

In addition, according to the present disclosure, some of longitudinal members of the side frame may overlap each other such that an inner side wall thereof is partially thickened, and the reinforcement material and the side frame or the mounting frame may be coupled to each other, to obtain effects of protecting a battery cell therein and minimizing an amount of internal intrusion in a side collision.

The above description may be merely an example of the technical idea of the present disclosure, and various modifications and variations may be made to those skilled in the art without departing from the essential characteristics of the present disclosure.

For example, in the present specification and drawings, an example in which the reinforcement material 30 extends in the width direction Y of the case body 1, parallel to left and right directions of the vehicle, may be illustrated, but is not necessarily limited thereto, and the reinforcement material may also extend in the longitudinal direction X of the case body, parallel to front and rear directions of the case body, to respond to a frontal collision of the vehicle.

Therefore, the embodiments disclosed in the present specification and drawings may not be intended to limit the technical spirit of the present disclosure, but to explain, and the scope of the technical spirit of the present disclosure may not be limited by these embodiments. The protection scope of the present disclosure should be construed according to the claims below, and all technical ideas within the equivalent range should be construed as being included in the scope of the present disclosure.

[Description of Reference Characters]

| | |
|---|---|
| 1: Case Body | 2: Cover |
| 3: Flange Portion | 4, SM: Space |
| 10: Bottom Plate | 20: Side Frame |
| 21: Fastening Hole | 22, 42: Through-Slit |
| 23: Inner Side Wall | 24: Outer Side Wall |
| 30: Reinforcing Material | 31: Body |
| 32: Hollow Portion | 33: Support Portion |
| 40: Mounting Frame | |

The invention claimed is:

1. A battery case comprising:

a case body accommodating a battery cell; and a cover coupled to the case body, wherein the case body includes:

a bottom plate;

a side frame coupled to the bottom plate to surround the battery cell, and including an inner side wall and an outer side wall;

a mounting frame coupled to the outer side wall of the side frame and having a space; and at least one reinforcement material disposed on the bottom plate and having both end portions in a longitudinal direction passing at least through the inner side wall of the side frame, wherein the side frame is formed to have at least three closed sections, the space of the mounting frame is located to correspond to one of the closed sections of the side frame, and an end portion of the reinforcement material is inserted into one of the closed sections of the side frame, wherein the reinforcement material comprises:

a body passing through the inner side wall of the side frame; and a support portion extending in a width direction of the body from an end portion of the body and contacting the inner side wall of the side frame, wherein a through-slit is formed in the inner side wall or the outer side wall of the side frame, and the end portion of the body is inserted into and shape-fitted to the through-slit of the side frame, wherein a through-slit is formed in the mounting frame, the end portion of the body passes through and protrudes from the mounting frame, a welded portion is formed on a coupled site between the body and the through-slit of the mounting frame.

2. The battery case of claim 1, wherein a welded portion is formed on a coupled site between the reinforcement material and the through-slit of the side frame.

3. The battery case of claim 1, wherein a thickness of the reinforcement material is thicker than a thickness of the side frame, and is thinner than a thickness of the mounting frame.

4. The battery case of claim 1, wherein, in the side frame, four or more transverse members are integrally formed with at least three closed sections by bending a single plate material, and the mounting frame is formed to have the space by bending a single plate material.

5. The battery case of claim 4, wherein a transverse member of the side frame defining one of the at least three closed sections and a transverse portion of the mounting frame defining the space of the mounting frame have the same height as each other in a longitudinal direction.

6. The battery case of claim 5, wherein a longitudinal member of the side frame defining one of the at least three closed sections overlaps a longitudinal member constituting the inner side wall or the outer side wall of the side frame.

* * * * *